(12) United States Patent
Kunii

(10) Patent No.: US 11,999,858 B2
(45) Date of Patent: Jun. 4, 2024

(54) LASER ADDITIVE AND ITS USE IN POLYMER MATERIALS

(71) Applicant: Merck Patent GmbH, Darmstadt (DE)

(72) Inventor: Koshiro Kunii, Fukushima-ken (JP)

(73) Assignee: MERCK PATENT GMBH, Darmstadt (DE)

( * ) Notice: Subject to any disclaimer, the term of this patent is extended or adjusted under 35 U.S.C. 154(b) by 829 days.

(21) Appl. No.: 17/055,351

(22) PCT Filed: May 13, 2019

(86) PCT No.: PCT/EP2019/062127
§ 371 (c)(1),
(2) Date: Nov. 13, 2020

(87) PCT Pub. No.: WO2019/219557
PCT Pub. Date: Nov. 21, 2019

(65) Prior Publication Data
US 2021/0222011 A1 Jul. 22, 2021

(30) Foreign Application Priority Data
May 16, 2018 (EP) .................. 18172573

(51) Int. Cl.
| | | |
|---|---|---|
| C09C 1/36 | (2006.01) | |
| C08K 3/22 | (2006.01) | |
| C08L 57/00 | (2006.01) | |
| C08L 83/04 | (2006.01) | |
| C08L 87/00 | (2006.01) | |
| C09C 3/06 | (2006.01) | |
| B41M 5/26 | (2006.01) | |
| B41M 5/333 | (2006.01) | |

(52) U.S. Cl.
CPC .............. *C09C 1/3661* (2013.01); *C08K 3/22* (2013.01); *C08L 57/00* (2013.01); *C08L 83/04* (2013.01); *C08L 87/00* (2013.01); *C09C 3/063* (2013.01); *B41M 5/267* (2013.01); *B41M 5/3338* (2013.01); *C08K 2003/2206* (2013.01); *C08K 2003/2241* (2013.01)

(58) Field of Classification Search
CPC ....... C09C 1/3661; C09C 3/063; C08L 57/00; C08L 83/04; C08L 87/00; C08K 3/22; C08K 2003/2241
See application file for complete search history.

(56) References Cited

U.S. PATENT DOCUMENTS

| | | |
|---|---|---|
| 5,945,035 A | 8/1999 | Vogt et al. |
| 6,693,657 B2 | 2/2004 | Carroll, Jr. et al. |
| 10,822,505 B2 | 11/2020 | Kniess et al. |
| 2007/0173581 A1 | 7/2007 | Hager et al. |

FOREIGN PATENT DOCUMENTS

| | | | |
|---|---|---|---|
| DE | 102013007750 A1 | 11/2014 | |
| EP | 1720712 B1 | 9/2008 | |
| EP | 1377522 B1 | 6/2010 | |
| JP | 2003/275600 * | 9/2003 | ............. B01J 35/02 |
| JP | 2003275600 A | 9/2003 | |
| JP | 4950651 B2 | 6/2012 | |
| JP | 5054330 B2 | 10/2012 | |
| WO | 17016645 A1 | 2/2017 | |

OTHER PUBLICATIONS

International Search report PCT/EP2019/062127 dated Jul. 12, 2019 (pp. 1-4).

* cited by examiner

*Primary Examiner* — Pegah Parvini
(74) *Attorney, Agent, or Firm* — Millen, White, Zelano & Branigan, P.C.; Ryan R. Pool

(57) ABSTRACT

The present invention relates to pigments which comprise niobium-doped titanium dioxide as well as a layer encapsulating the niobium-doped titanium dioxide, to polymer materials containing same and to the use of said pigments as laser absorbing additive in products comprising at least one polymer material and said encapsulated niobium-doped titanium dioxide containing pigments.

20 Claims, No Drawings

LASER ADDITIVE AND ITS USE IN POLYMER MATERIALS

The present invention relates to an additive for laser-markable polymer materials, and in particular to pigments which comprise niobium-doped titanium dioxide as well as a layer encapsulating the niobium-doped titanium dioxide as laser absorbing additive in polymer materials, to polymer materials which comprise a laser absorbing additive of this type and to a laser-marked product comprising at least one polymer material and said encapsulated niobium-doped titanium dioxide containing pigments as laser absorbing additive.

The labelling of manufactured goods is a standard procedure in virtually all branches of industry. Frequently, product information details such as dates of manufacture, batch numbers, serial numbers, barcodes, 2D codes, company logos or expiry dates have to be applied to plastic articles. To this end, contactless, very rapid as well as flexible marking technologies are preferred, such as laser marking procedures. Using this technology it is possible to apply inscriptions in polymeric parts or objects at high speed, even to a non-planar surface. Since an inscription produced this way is located in the plastic body itself, it is permanently resistant to abrasion.

Since many plastics are transparent to laser light, laser sensitive agents which cause a local, highly visible discoloration in the plastic material are usually added to the plastics. The discoloration in the plastic may be produced either directly as a result of interaction of the laser light with the polymer or indirectly as a result of interaction of the laser light with the laser-absorbing additive. The laser-sensitive additive can be an organic dye or a pigment which absorbs the laser light. Various causes may be given for the discoloration, for example, the decomposition of the polymer or the conversion of the laser-absorbing additive itself from an invisible form to a visible form. A darkening in the color of the plastic generally occurs due to carbonisation as a consequence of the laser energy introduced.

Numerous additives are known for the laser marking of plastics. Suitable materials for laser-marking using Nd-YAG lasers (neodymium doped yttrium aluminium garnet lasers), YVO4 lasers (yttrium vanadate lasers) and 1064 nm fibre lasers are preferably those which absorb light of wavelength 1064 nm and themselves have only a slight intrinsic color. Examples are copper phosphates, bismuth oxide, bismuth oxychloride, antimony-doped tin oxide, antimony-doped tin oxide on substrates, antimony trioxide, fluorine doped tin oxide, indium doped tin oxide or metals.

For example, EP 1377522 A2 describes additives for laser-marking of plastics which consist of a calcined antimony/tin mixed oxide in which the antimony concentration at the surface is greater than that in the particles as a whole. The particle size is 0.1-10 μm, preferably 0.5-5 μm. With such an additive, dark markings on pale backgrounds are obtained.

In EP 1720712 A1 highly transparent laser-markable and laser-weldable plastic materials which comprise doped tin oxides, antimony oxides or indium oxides with particle sizes of 1-100 nm are described, which lead to highly transparent plastic parts. The markings obtained here are dark.

In WO 2017/016645 A1, spherical titanium dioxide particles coated with an antimony-doped tin oxide layer and exhibiting a particle size in the range of <15 μm are suggested as laser absorbing additive for polymer materials.

As may be taken from these publications, a laser additive which is often used is composed of or contains antimony-doped tin oxide, the latter in particular on a mica substrate. Antimony doped tin oxide absorbs laser light quite well, exhibits only a slight greyish color itself and leads to dark markings in plastic materials, but the dark markings have a brownish tinge rather than being blackish. In addition, antimony as a dopant is subject to administration restrictions in some countries, since environmental damage and health problems thereby are feared, which could occur, in particular, during the preparation or recycling of the corresponding compounds or components comprising it.

There were therefore numerous attempts to avoid antimony as a dopant in laser-absorbing additives. Titanium dioxide is a material which is antimony free and not harmful to neither environment nor health. The material is able to absorb laser light and leads to markings in plastics when used as laser-absorbing additive, but the laser sensitivity is not strong enough to give dark markings of high contrast in different plastic materials and under different laser marking conditions.

In addition, titanium dioxide particles are known to exhibit a certain photocatalytic activity, which will lead to a yellowing effect in most polymer materials when the articles made therefrom are exposed to UV light.

There was therefore still a need for light or colored plastics which are laser-markable, where the laser-absorbing additives contained therein induce sharp and dark laser markings by laser action not exhibiting a brownish tinge under various laser marking conditions, where environmental or health damages are not expected by using these laser-absorbing additives and where the polymer materials containing them are not supposed to undergo a color change due to the influence of solar light, especially of UV light.

Thus, the object of the present invention is to provide a laser sensitive, i.e. a laser absorbing additive in form of a pigment for polymer materials which are supposed to be laser-marked when in form of an article containing the polymer material, where the laser absorbing additive enables the creation of sharp dark bluish to blackish laser markings with excellent contrast in these polymer materials, does not contain dopant materials which might be harmful for health and/or environment of people and does not induce a substantial color changing effect to the polymer material under the influence of solar light.

Furthermore, the object of the present invention is suggesting the use of such a pigment.

In addition, the object of the present invention is to provide a polymer composition having a laser absorber additive therein, where the laser absorber enables the creation of sharp dark bluish to blackish laser markings with excellent contrast of these polymer materials, does not contain dopant materials which might be harmful for health and/or environment of people and wherein the polymer composition does not undergo a substantial color change when exposed to solar light.

Still furthermore, an additional object of the present invention is to provide articles comprising a polymer composition which might be easily laser-marked and, if laser-marked, exhibit sharp black or blackish laser markings on their surface, which do not contain dopant materials which might be harmful for health and/or environment of people and do not suffer from a substantial color change under the influence of solar light.

Surprisingly, the present inventors have found that niobium-doped titanium dioxide is capable of fulfilling the required characteristics when used as laser absorbing material in a polymer material, provided that the niobium-doped titanium dioxide is not in direct contact with the polymer material.

Particles which contain niobium-doped titanium dioxide are know per se. In JP 4950651 B, a resin composition is disclosed which contains particles of niobium-doped titanium dioxide, which are distributed in the resin. The resin is used in an interlayer in glass laminates in order to shield incident solar radiation to some extent.

In JP 5054330 B, a granular conductive particle powder is disclosed which is composed of a core particle having an electrically conductive layer thereon, wherein the conductive layer is composed of niobium-doped titanium dioxide. The conductive particles are used in conductive inks and paints as well as for conductive films made by using the inks and paints.

In U.S. Pat. No. 5,945,035, electrically conductive pigments are described, which have a conductive layer on a platelet-shaped or needle-shaped substrate, wherein the conductive layer may be composed of niobium- and/or tantalum-doped titanium dioxide. The pigments are pale, opaque, decorative pigments having a high electrical conductivity.

Encapsulated niobium-doped titanium dioxide containing pigments and their use as laser absorber in polymeric materials were not known heretofore.

The present invention thus relates to pigments comprising a particle containing niobium-doped titanium dioxide and a layer encapsulating the niobium-doped titanium dioxide containing particle, the encapsulating layer comprising at least a calcium compound.

Furthermore, the present invention relates to the use of said pigments as laser absorbing additive in polymer compositions.

In addition, the present invention relates to a polymer composition, comprising at least one polymer compound and a laser absorber, where the laser absorber comprises pigments comprising a particle containing niobium-doped titanium dioxide and a layer encapsulating the niobium-doped titanium dioxide containing particle, the encapsulating layer comprising at least a calcium compound.

Still furthermore, the present invention relates to a laser-markable article consisting of a corpus having a surface, whereby the corpus is composed of a polymer composition as described above or comprises such a polymer composition at least at a part of its surface.

The present invention, in a first aspect, relates to pigments which comprise a particle containing niobium-doped titanium dioxide and a layer which encapsulates, i.e. surrounds, the particle containing niobium-doped titanium dioxide, so that the niobium-doped titanium dioxide is not in direct contact with the polymer matrix which it is applied to when used in any polymer based application.

The niobium-doped titanium dioxide is applied in the present invention in form of a solid particle containing it and providing the core of the pigment according to the present invention, whereby the core may be structured in three general embodiments.

In a first embodiment, the core particle consists of neat niobium-doped titanium dioxide. In a second embodiment, the core particle is composed of a substrate particle having a layer directly on the surface of the substrate particle (which advantageously surrounds the substrate particle), where the layer is composed of niobium-doped titanium oxide and forms the uppermost layer of the core particle. In a third embodiment, the core particle is composed of niobium-doped titanium dioxide in an intimate mixture with another material which might be a laser absorbing material as well.

In the first embodiment, which is preferred, the pigment according to the present invention comprises a core particle which consists of neat niobium-doped titanium dioxide, wherein the core particle is encapsulated by a layer comprising at least one calcium compound. The detailed composition of the encapsulating layer will be described later.

Pigments of this type may exhibit any shape and are provided, for example, in a spherical, spheroidal or in an irregular granular shape. These pigments have particle sizes in the range of from 0.01 to 100 µm, in particular of from 0.05 to 80 µm. The $d_5$-value (5 volume percent of the particles are equal or smaller than the given value) is preferably in the range of from 0.1 to 5 µm, whereas the $d_{95}$ value (95 volume percent of the particles are equal or smaller than the given value) is preferably in the range of from 10 to 60 µm, with a $d_5$-value of 1 µm in combination with a $d_{95}$ value of 15 µm being most preferred. Since the encapsulating layer follows the shape of the core particle, the shapes of the pigments mentioned above correspond to the shape of the respective core particles as well.

In the second embodiment, the pigments according to the present invention are based on cores which are composed of substrate particles which bear a coating directly on the surface of the substrate particle, where the coating is composed of niobium-doped titanium dioxide and forms the uppermost layer of the core particle. As substrate materials, silicatic materials such as natural or synthetic mica, talc or sericite, undoped or doped titanium dioxide, alumina, silica, carbon, graphite, iron oxide, barium sulfate or pearl pigments may be used. The doped titanium dioxide has a doping of Al, Si, Zr or Mn here. Mica and undoped titanium dioxide are preferably used as substrate materials since they are easily available and not expensive.

The niobium-doped titanium dioxide layer and the substrate particle are present in the core particle in a weight ratio of from 10:90 up to 99:1, relative to the weight of the entire core particle. Advantageously, the weight ratio layer:core of the core particle is in the range of 50:50 to 95:5, relative to the weight of the entire core particle.

Core particles according to the second embodiment usually exhibit the shape of the substrate material used. The substrate material may have for example a platelet shape, a fibrous shape, a spherical, spheroidal, lenticular or an irregular granular shape. A spherical, platelet or irregular granular shape is preferred, depending on the substrate material used.

The core particles bearing the uppermost layer of niobium-doped titanium dioxide are encapsulated by a layer comprising at least a calcium compound like the core particles of the first embodiment.

The particle size of pigments of this type may also be in the range of from 0.01 to 100 µm, in particular of from 0.05 to 80 µm, exhibiting $d_5$-values in the range of from 0.1 to 5 µm and $d_{95}$-values in the range of from 10 to 60 µm, as already disclosed above. A $d_5$-value of 1 µm in combination with a $d_{95}$-value of 15 µm is most preferred. The pigments according to the second embodiment preferably do also exhibit the shape of the substrate material.

In the third embodiment, the pigments according to the present invention are provided in form of pigment core granules consisting of a mixture of niobium-doped titanium dioxide and of at least one further material which by itself may or may not absorb laser rays, encapsulated by a layer comprising at least a calcium compound. Preferably, the at least one further material present in the core granule does also absorb laser rays. The at least one further material may generally be selected form the group consisting of carbon black, antimony, $TiO_2$, Al-, Si-, Zr-, Mn- or Sb-doped $TiO_2$, $Sb_2O_3$, mixed Sb/Sn oxides, Sb-, F-, or P-doped $SnO_2$, copper hydroxide phosphate, copper phosphate, magnetite, molybdenum sulfide, molybdenum oxide and/or BiOCl, but antimony-free materials are preferred due to the object of the invention. The pigment core granule consists of an intimate mixture of the niobium-doped titanium dioxide with the at least one further material. The pigment may exhibit any shape such as a spherical shape, a spheroidal shape, a lenticular shape, a sausage shape or an irregular shape. It goes without saying that the particle shapes may be slightly deformed due to the technical procedure by which they are formed. The particle size of the pigment according to the third embodiment is in the range of from of from 0.01 to 100 µm, in particular of from 0.05 to 80 µm, exhibiting $d_5$-values in the range of from 0.1 to 5 µm and $d_{95}$-values in the range of from 10 to 60 µm. A $d_5$-value of 1 µm in combination with a $d_{95}$-value of 15 µm is most preferred.

In the second and third embodiment, the content of niobium-doped titanium dioxide in the core particle of the pigment according to the present invention is at least 10% by weight, based on the weight of the entire core particle. Advantageously, the content of niobium-doped titanium dioxide is 10 to 99% by weight, in particular 30 to 95% by weight, preferably 40 to 90% by weight and especially 50 to 80% by weight, based on the weight of the entire core particle, in order to assure the advantages of the niobium-doped titanium dioxide when the pigment is used as laser absorbing additive in polymer compositions.

In all three embodiments described above, the percentage molar proportion of niobium in the niobium-doped titanium dioxide is in the range of from 0.05 to 15%, based on the molar mass of titanium. In particular, the percentage molar proportion of niobium is in the range of from 0.1 to 10%, especially of from 0.3 to 5%, based on the molar mass of titanium.

For the purpose of the present invention, the particle size is regarded as being the length of the longest axis of the pigments. The particle size can in principle be determined using any method for particle-size determination that is familiar to the person skilled in the art. The particle size determination can be carried out in a simple manner, depending on the size of the laser sensitive pigments, for example by direct observation and measurement of a number of individual particles in high-resolution light microscopes, but better in electron microscopes, such as the scanning electron microscope (SEM) or the high-resolution electron microscope (HRTEM), but also in the atomic force microscope (AFM), the latter in each case with appropriate image analysis software. The determination of the particle size can advantageously also be carried out using measuring instruments (for example Malvern Mastersizer 3000, APA300, Malvern Instruments Ltd., UK), which operate on the principle of laser diffraction. Using these measuring instruments, both the particle size and also the particle-size distribution in the volume can be determined from a pigment suspension in a standard method (SOP). The last-mentioned measurement method is preferred in accordance with the present invention.

Regarding the encapsulating layer which is present in the pigments according to the present invention in all three embodiments mentioned above directly on top of the core particle surrounding the same, it comprises at least a calcium compound. According to the present invention, the calcium compound is preferably CaO or is CaO mixed with $CaCO_3$, CaO mixed with $CaTiO_3$ or CaO mixed with $CaCO_3$ and $CaTiO_3$. Preferably, the encapsulating layer comprises a percentual weight content of the at least one calcium compound of at least 80% by weight, based on the weight of the encapsulating layer. The remaining percentage of up to 20% by weight may be composed of a further metal oxide or further metal oxides, where the metal is selected from the group consisting of Zr, Ce, Si, Al, Zn and V. The content of the further metal oxide(s) is in the range of from 0 to 20% by weight, preferably in the range of from 0 to 10% by weight, based on the weight of the encapsulating layer. Correspondingly, the content of the calcium compound is in the range of from 80 to 100% by weight, preferably of from 90 to 100% by weight, based on the weight of the encapsulating layer.

According to the present invention, the encapsulating layer comprising the at least one calcium compound has a thickness in the range of from 0.5-1000 nm, preferably of from 1 to 200 nm, especially in the range of from 3 to 150 nm.

The percentual weight content of the encapsulating layer, based on the weight of the core particle, is in the range of from 1 to 30% by weight.

The encapsulating layer surrounds and encapsulates the core particle of the pigments according to the present invention and, thus, prevents the niobium-doped titanium dioxide being comprised in the core particle to be in direct contact with the application medium, when the pigments according to the present invention are used. This is of advantage in any application medium, since titanium dioxide being the main compound of the niobium-doped titanium dioxide is known to exhibit a certain photocatalytic property, but is of particular advantage with respect to the use of the present pigments as laser absorbing additives in polymer compositions, since most polymers usually used for this purpose decompose when supposed to solar light, especially UV light, in case titanium dioxide is present in the respective polymer composition.

Surprisingly, the laser absorbing property of the niobium-doped titanium dioxide is not diminished by the encapsulating layer. In addition, the pale color of the niobium-doped titanium dioxide is not darkened by the encapsulating layer comprising at least a calcium compound.

The niobium-doped titanium dioxide used in the core particle of the pigments according to the present invention may be produced as known in the art. To this end, a solution of a titanium compound and a solution of a niobium compound in deionized water are deposited in a vessel while setting the pH with the help of an acid at a range of about 2.0. The solution is heated to and kept constant at a temperature of about 50 to 95° C. and the pH is kept constant by addition of a base over a period of about 0.5 to 5 hours. After the precipitation of the corresponding niobium-doped titanium dioxide hydrate, the resulting product is filtered, washed and dried. In order to convert the oxide hydrate into oxide, the dried product is calcined at a temperature in the range of from 500 to 1100° C. over a period of from 5 minutes to 5 hours. After calcination, the resulting product may be milled if required.

As raw materials, inorganic water soluble raw materials are preferred. For instance, the titanium raw material may be $TiCl_4$, $TiCl_3$, $TiOSO_4$ or peroxotitanate. As niobium raw material, e.g. $NbCl_5$, $Nb_2O_5$, NbO or peroxoniobate may be used. For the production of an alkaline solution, NaOH or $Na_2CO_3$ may be used. As acid, usually HCl is used. It goes without saying that other appropriate raw materials might be used as well. Water soluble inorganic materials are preferred in order to be able to execute the production process in an inexpensive and easily to handle aqueous medium.

The production of pigments containing a niobium-doped titanium dioxide layer on a substrate particle may be executed for example as described in U.S. Pat. No. 5,945,035. Here as well, a final calcination step might be executed.

For the production of the pigments according to the present invention, the core particles containing niobium-doped titanium dioxide are encapsulated by an encapsulating layer comprising at least a calcium compound. Preferably, the calcium compound is CaO or is a mixture of CaO with $CaCO_3$ and/or $CaTiO_3$, depending on the production route. Any water soluble calcium compound, especially an inorganic calcium salt, may be used for the production of the encapsulating layer. Preferably, $CaCl_2$) or $Ca(NO_3)_2$ is used. Small amounts of water soluble salts of Zr, Ce, Si, Al, Zn or V may be present as well.

The core particles are coated with the calcium compound containing layer by dispersing them in an aqueous solution at a pH in the range of from 6.5 to 7.5, preferably of about 7.0, and adding a water soluble calcium salt as well as $H_2O_2$, $NaCO_3$ or $KCO_3$, while keeping the pH constant at a temperature in the range of from 50 to 100° C. After the reaction is completed, the dispersion is filtered and the solids are washed and dried. Thereafter, the solid particles are supposed to at least one calcination step in order to convert the intermediate calcium products to CaO or CaO mixed with $CaCO_3$ and/or $CaTiO_3$ at a temperature in the range of from 600 to 1000° C.

The calcination of the core particles as well as the calcination of the encapsulated core particles containing niobium-doped titanium dioxide may take place in air, in an inert gas atmosphere or in a reducing gas atmosphere. It has surprisingly turned out that, if the niobium-doped titanium dioxide hydrate or niobium-doped titanium dioxide contained in the core particles is calcined in a reducing atmosphere, regardless whether this calcination step is carried out directly after the niobium-doped titanium dioxide hydrate is produced or after encapsulation of the same with an encapsulating layer comprising a calcium compound, the performance as a laser absorbing material is better than after the same product is calcined under ambient conditions or in an inert gas atmosphere. Without being bound to theory it is assumed that when the calcination is executed in a reducing atmosphere, some oxygen defects in the crystal lattice of the resulting titanium dioxide may be produced which enlarge the laser absorbing performance of the resulting niobium-doped titanium dioxide.

In case the niobium-doped titanium dioxide hydrate is produced just prior to its encapsulation with the calcium compound comprising encapsulation layer in a one-pot reaction, the intermediate calcination step may be omitted and only a final calcination may be executed. Regarding reaction time and effort, this procedure is preferred.

Preferably, the final calcination should then be carried out in two steps. At first, a calcination step in air should be carried out in order to convert the titanium dioxide hydrate of the core particle and the calcium oxide hydrate or calcium carbonate hydrate of the encapsulating layer to the respective oxides. Traces of $CaCO_3$ and or CaTiO3 may be present in the encapsulating layer as well. Next, in a second calcination step, a further calcination should take place in a reducing $N_2/H_2$ or $H_2$ gaseous atmosphere as generally known in the art as reducing gas atmosphere in order to produce the oxygen defects in the crystal lattice of the resulting titanium dioxide as mentioned above. The temperature of the calcination step under reducing conditions should be adjusted in the range of from 600 to 1000° C.

The present pigments, namely the pigments comprising a particle containing niobium-doped titanium dioxide and a calcium compound comprising layer encapsulating the niobium-doped titanium dioxide comprising particle which are subject to a calcination step under reducing conditions prior to their use as laser absorbing additive are preferred according to the present invention.

In a second aspect, the present invention relates to the use of the pigments described above as laser absorbing additives in polymer compositions. Through the addition of the pigments according to the invention as additives to the polymer composition, in particular in concentrations of 0.001 to 20% by weight, preferably 0.01 to 10% by weight and very particularly preferred 0.05 to 3% by weight, based on the total weight of the polymer composition which is contained in an article to be marked (the latter being produced by using the polymer composition), a high contrast is achieved in a dark bluish or blackish laser marking on the surface of articles which is comparably closer to pure black in color than laser markings made by using the commercially available absorbers at comparable concentrations. Furthermore, the polymer composition itself, when supposed to solar radiation, exhibits much less, if any, color change due to the exposure to solar light than polymer compositions containing titanium dioxide containing particles of the prior art. In addition, the laser absorbing additive itself does not comprise substances which might be disadvantageous for environment and health of people and are, furthermore, of good heat resistivity, the latter being important if the corresponding articles produced are exposed to high temperatures at any point of production and/or use thereof. The said concentrations are not solely dependent on the desired contrast, but also on the layer thickness of the use medium. Thus, significantly higher concentrations are necessary in print and coating applications than in plastic bodies in order to provide the laser beam with a sufficient number of pigment particles.

The concentration of the pigments according to the invention, when used as laser additive in polymers or in polymer systems, preferably in thermoplastics, thermosets, elastomers or silicones, is, however, also dependent on the polymer material employed. The low proportion of laser pigment changes the polymer system insignificantly and does not affect its processability. It is a remarkable advantage of the present invention that merely low concentrations of the present laser additive are necessary in order to achieve contrastful laser markings of good quality, sharpness and dark blackish colour in the goods produced therewith. Since the present pigments exhibit a pale body color and the required concentration is low, the polymer compositions provided therewith may exhibit a light body color as well, being rather whitish or light bluish than yellowish.

Furthermore, besides the laser absorbing additives according to the present invention, colorants can be added to the polymers, allowing color variations of all types and at the same time ensuring retention of the laser marking. Suitable colorants are, in particular, coloured metal-oxide pigments and coloured organic pigments and dyes which do not decompose during the laser marking and do not react under laser light.

Optionally, solvents, fillers and other additives of any kind which are usually used in polymer compositions might be present in combination with or alternatively to colorants in the polymer composition having incorporated the pigments as described above. Suitable fillers and additives are, for example, flame retardants, antioxidants, light stabilizers, process aids, inorganic fillers, etc.

Suitable polymer materials for the polymer composition of the present invention are all known polymers, especially those which do not absorb laser rays to the required extent for marking, in particular thermoplastics, furthermore also thermosets and elastomers, as described, for example, in Ullmann, Vol. 15, pp. 457 ff., Verlag VCH. Suitable polymers are, for example, polyethylene, polypropylene, polyamides, polyesters, polyester-esters, polyether-esters, polyphenylene ether, polyacetal, polyurethane, polybutylene terephthalate (PBT), polymethyl methacrylate, polyvinyl acetal, polystyrene, acrylonitrile-butadiene-styrene (ABS), acrylonitrile-styrene-acrylate (ASA), polycarbonate, polyether sulfones and polyether ketones, and copolymers, mixtures and/or polymer blends thereof, such as, for example, PC/ABS, MABS.

Suitable thermosetting polymers are, for example, polyurethane, melamine resins, epoxy resins and particular polyester resins.

Silicone resins and polysiloxanes are useful as well, although they are not capable to carbonize under the action of laser light.

The pigments according to the present invention are incorporated into the polymer composition being the starting material for the desired article to be marked, the latter being preferably a shaped plastic article or a plastic film, or a corpus of any material comprising a solidified polymer coating on its surface, for example a solidified paint or paper coating, or a powder coating, a solidified automobile paint or printing ink, etc., by mixing the polymer granules, the coating composition or the printing ink with the pigments and optionally deforming the mixture under the action of heat. The pigment can be added to the polymer composition simultaneously or successively. Adhesives, organic polymer-compatible solvents, stabilisers and/or surfactants which are temperature-stable under the working conditions can optionally be added to the polymer composition, preferably plastic granules, during incorporation of the pigment.

The incorporation of the pigments according to the present invention into plastic granules can take place, for example, by compounding, via a masterbatch, via pastes or by direct addition during the shaping processing step (direct pigmentation). One or more additives, such as, for example, those selected from the group of processing aids, antioxidants, lubricants, stabilisers, flame retardants, fillers and colour-imparting pigments, can optionally be added to the starting polymer, preferably also in the form of plastic granules, during the incorporation of the pigment. The laboratory preparation of the doped plastic granules is generally carried out by initially introducing the plastic granules in a suitable mixer, wetting them with one or more dispersion aids and then adding and incorporating the present pigments and the colored pigments required. In industrial practice, the coloring of the polymer composition and the addition of additives to the polymer composition is usually carried out via a color concentrate (masterbatch) or compound. For this purpose, colored pigments and additives are dispersed in the molten plastic with high shear in extruders (usually co-rotating twin-screw extruders). The plastic melt exits through a perforated plate on the extruder head and is converted into granules by means of suitable downstream devices (for example strand pelletising processes or underwater granulation). The granules thus obtained can be further processed directly in an extruder or injection molding machine. The moldings formed during the processing exhibit very homogeneous distribution of the present pigments. Subsequently, the laser marking is carried out using a suitable laser.

In case the polymer material of the polymer composition is a polymer binder and the polymer composition is a coating composition or a printing ink, the pigment of the present invention may simply be mixed with the corresponding polymer binder and, optionally, with solvents and/or other additives and fillers which are usually used in coating and printing systems.

The present invention, in a third aspect, does also relate to a polymer composition which comprises at least one polymer compound and a pigment according to the present invention as described above. The at least one polymer compound is selected from the group as disclosed above. Polymer mixtures and/or copolymers thereof are often used as well. The polymer composition according to the present invention may comprise, besides the present pigments which are preferably used as laser absorbing additives, further additives and/or fillers which are usually used in polymer compositions as already described above. Optionally, solvents may be present as well. The polymer compounds for the polymer composition according to the present invention are thermoplastic, thermosetting, elastomer or silicone materials.

The pigment according to the present invention which comprises niobium-doped titanium dioxide in a core particle and an encapsulating layer on the core particle which comprises at least a calcium compound is present in the polymer composition in a proportion of 0.001 to 20% by weight, preferably 0.01 to 10% by weight and very particularly preferably 0.05 to 3% by weight, based on the total weight of the polymer composition. It is a great advantage of the present invention that even merely small amounts of the present pigments used as laser absorbing additive can lead to very sharp, contrastful dark markings in the resulting article composed of or containing the polymer composition according to the present invention, while providing alight colored polymer composition which does not change its color significantly when exposed to solar radiation.

In a fourth aspect, the present invention does also relate to a laser markable article, whereby the article consists of a corpus having a surface, and where the corpus or at least the surface thereof is composed of a polymer composition as described above. The corpus may have any shape and is, by itself, a part of an object of interest or the object itself, i.e. the desired good. The corpus may be composed of any polymer material, of the polymer composition containing the present pigments as laser absorbing additive, of metal, wood, paper, cardboard or the like, as long as at least the surface of the corpus is composed of or comprises the polymer composition containing the present pigments as laser absorbing additive and as long as the corpus material can stand the temperature of the laser action required to produce the requested laser marking. Said article is laser markable due to the content of the laser marking additive pigments. To this end, a laser marking is advantageously present at least on the surface of the article. The corresponding laser marking is a sharp blackish or dark bluish marking with high contrast on a light or colored surface of the article which does not significantly change its color due to the excitation by solar radiation. The darkness of the marking does, inter alia, depend on the actual concentration of the laser absorbing pigment in the polymer composition as well as, to some extent, on the laser apparatus used.

Besides the excellent optical properties, contrast and edge sharpness, the finely divided laser absorbing pigments in the polymer composition and, accordingly, in the laser markable article according to the present invention allow rapid marking and provide a large processing window based on the laser settings.

The inscription of the article comprising the polymer composition according to the present invention using a laser is carried out by bringing the specimen into the ray path of a pulsed laser, preferably an Nd:YAG laser, $VO_4$ laser or 1064 nm fibre laser. Furthermore, inscription using an excimer laser, for example via a masking technique, is possible. However, the desired results can also be achieved using other conventional types of laser which have a wavelength in a region of high absorption of the pigment used. The marking obtained is determined by the irradiation time (or pulse count in the case of pulsed lasers) and irradiation power of the laser and also by the polymer system used. The power of the laser used depends on the particular application and can readily be determined by the person skilled in the art on a case by case basis.

The lasers used generally have a wavelength in the range from 100 nm to 32 µm, preferably in the range from 355 nm to 10.9 µm and most preferably in the range from 800 nm to 1200 nm. Mention may be made here, for example, of $CO_2$ lasers (about 10.6 µm), Nd:YAG lasers (about 1064 nm), YVO4 lasers (about 1064 nm), fibre lasers (about 1064 nm), green lasers (532 nm), UV lasers (355 nm) or semiconductor diode lasers (405-3330 nm). The excimer lasers have the following wavelengths: $F_2$ excimer laser (157 nm), ArF excimer laser (193 nm), KrCl excimer laser (222 nm), KrF excimer laser (248 nm), XeCl excimer laser (308 nm) and XeF excimer laser (351 nm).

Most preferably the laser is a pulsed near infrared laser with a wavelength of about 1064 nm. The fibre laser, the YAG laser and the YVO4 laser belong to this class of lasers. The laser shall be pulsed with a pulse duration ranging from nano to femto seconds. Corresponding lasers which can be used in the process according to the invention are commercially available.

The polymer composition which comprises the pigments in accordance with the present invention can be used in all fields where conventional printing processes or laser marking processes have hitherto been used for the inscription of plastics. For example, molding compositions, semi-finished products and finished parts made from or containing the polymer composition according to the invention can be used in the electrical, electronics and automotive industry. The labelling and inscription of, for example, cables, pipes, decorative strips or functional parts in the heating, ventilation and cooling sector or switches, plugs, levers and handles which consist of the polymer composition comprising the present pigments as laser absorbing additive can be carried out with the aid of laser light even in places that are difficult to access. Furthermore, the polymer composition according to the present invention can be used in packaging in the food sector or in the toy sector. Almost every article that can be manufactured by using the polymer composition of the present invention for producing a coating layer or printed ink layer on the surface thereof may also be manufactured and provided with a laser marking. This belongs especially to security and identification applications (credit cards, identification plates, labels) or advertising applications (logos, decorative elements, promotional articles). The markings on the packaging, security or advertising products are distinguished by the fact that they are longlasting and wipe- and scratch-resistant. For packaging applications, it is further advantageous that they are also stable during subsequent sterilisation processes and can be applied in a hygienically pure manner during the marking process. Complete label images can be applied permanently to the packaging for a reusable system. Furthermore, the polymer composition according to the present invention may be used in medical technology, for example in the marking von Petri dishes, microtitre plates, disposable syringes, ampoules, sample containers, supply tubes and medical collecting bags or storage bags.

A further important area of application for laser inscription are plastic tags for the individual labelling of animals, so-called cattle tags or ear tags. A barcode system is used to store the information which specifically belongs to the animal. This can be read off as required with the aid of a scanner. The inscription has to be very durable since the tags sometimes remain on the animals for a number of years.

The laser marking of molding compositions, semi-finished products and finished parts which consist of the polymer composition according to the invention or of articles which comprise the latter at least on the surface thereof is thus possible.

The use of the pigments according to the present invention as laser absorbing additives in polymer compositions allows the creation of contrastful dark markings in light colored polymers and the markings do not exhibit a brownish tinge but are dark blackish to bluish markings desired in the market, while the resulting articles need not to contain antimony which might be harmful for environment and health of people. Furthermore, the articles made from the polymer compositions do not significantly change their color when being excited by solar radiation, although the laser additive comprises photocatalytically active titanium dioxide. In addition, the content of very small amounts of the laser additive pigment according to the present invention allows rapid marking with high pulse rates and provides a large processing window based on the laser settings.

The examples below are intended to explain the invention, but without limiting it. The percentages indicated are percent by weight.

EXAMPLE 1

Nb-Doped $TiO_2$ Particle with CaO-Encapsulating Layer ($H_2O_2$-Route)

1.6 l of deionized water are heated in a reaction vessel to a temperature of about 75° C. The pH of the solution is adjusted with HCl (35%) to 1.8. A solution of 8.83 g $NbCl_5$ powder in 374 g HCl (35%) and a 1490 ml $TiCl_4$ solution (416 g/l) is then slowly dropped into the starting solution while the pH is kept at 1.8 with NaOH (32%). After the reaction is accomplished, the pH is adjusted at 7.0 by adding NaOH (32%) and the temperature of the resulting dispersion is raised to 80° C. Then, an aqueous mixture of 25.27 g $CaCl_2*2H_2O$, 50.85 g deionized water and 98.3 g $H_2O_2$ (30%) is added while keeping the pH constant. The reaction is finalized within about 1.5 hours. Finally, the solids are filtered, washed with deionized water and dried at 105° C. for several hours, whereby Nb-doped titanium oxide hydrate powder coated with calcium oxide hydrate is obtained. The dried powder is calcined at 850° C. for 7 minutes in an electric furnace. Afterwards, the calcined powder is calcined again under reducing conditions (1% $H_2$ gas) at 700° C. for 10 minutes.

A pigment comprising a core particle of niobium-doped titanium dioxide and an encapsulating layer of calcium oxide is obtained.

EXAMPLE 2

Nb-Doped $TiO_2$ Particle with CaO Encapsulating Layer ($Na_2CO_3$-Route)

1.6 l of deionized water are heated in a reaction vessel to a temperature of about 75° C. The pH of the solution is adjusted with HCl (35%) to 1.8. A solution of 8.83 g $NbCl_5$ powder in 374 g HCl (35%) and a 1490 ml $TiCl_4$ solution (416 g/l) is then slowly dropped into the starting solution while the pH is kept at 1.8 with NaOH (32%). After the reaction is accomplished, the pH is adjusted at 7.0 by adding NaOH (32%) and the temperature of the resulting dispersion is raised to 80° C. Then, an aqueous mixture of 25.27 g $CaCl_2*2H_2O$, 246 g deionized water and 24.65 g $Na_2CO_3$ is added while keeping the pH constant. The reaction is finalized within about 1.5 hours. Finally, the solids are filtered, washed with deionized water and dried at 105° C. for several hours, whereby Nb-doped titanium oxide hydrate powder coated with calcium carbonate hydrate is obtained. The dried powder is calcined at 850° C. for 7 minutes in an electric furnace. Afterwards, the calcined powder is calcined again under reducing conditions (1% $H_2$ gas) at 700° C. for 10 minutes.

A pigment comprising a core particle of niobium-doped titanium dioxide and an encapsulating layer of calcium oxide is obtained.

COMPARATIVE EXAMPLE 1

Nb-Doped $TiO_2$ Particle without Encapsulating Layer 1.6 l of deionized water are heated in a reaction vessel to a temperature of about 75° C. The pH of the solution is adjusted with HCl (35%) to 1.8. A solution of 8.83 g $NbCl_5$ powder in 374 g HCl (35%) and a 1490 ml $TiCl_4$ solution (416 g/l) is slowly dropped into the starting solution while the pH is kept at 1.8 with NaOH (32%). After the reaction is accomplished, the pH is adjusted at 7.0 by adding NaOH (32%). Finally, the solids are filtered, washed with deionized water and dried at 105° C. for several hours. The dried powder is calcined under reducing conditions (4% $H_2$ gas) at 710° C. for 30 minutes.

A niobium-doped titanium dioxide particle is obtained.

Evaluation of Laser Marking Properties:

0.06 g of the pigments according to examples 1 and 2 and comparative example 1 are mixed with 19.94 g of a PVC T-sol compound (product of Nippon Pigment Co.) under vacuum in a planetary mixer (ARV-310, Thinky Co.). The mixture is coated onto a 0.1 mm PET film and dried at 180° C. for 3 minutes. Each test piece has an overall thickness of about 0.5 mm. The concentration of the pigment in the coating composition is 0.3% by weight, based on the weight of the total coating composition.

A further comparative sample (comp. ex. 2) is prepared, using Iriotec® 8825 (laser pigment of Merck KGaA, antimony-doped tin oxide on mica substrate) as laser absorbing pigment instead of the pigments according to the present invention. The content thereof is 0.3 weight % as well, based on the weight of the total coating composition.

The coated plastic films are irradiated by a 1064 nm fiber laser (LP-V10U of Panasonic Sunx) under standard conditions to form a test grid.

Maximum output: 15 W

Pulse frequency: 20 KHz-100 KHz

| | Laser marking property | | |
|---|---|---|---|
| | Marking darkness | reactivity | color |
| Comparative example 1 | excellent | excellent | bluish black |
| Comparative example 2 | good | good | brown |
| Example 1 | excellent | excellent | bluish black |
| Example 2 | excellent | excellent | bluish black |

The examples show that the pigments according to the present invention, when used as laser absorbing additives, exhibit the same excellent laser marking ability as the niobium-doped titanium dioxide particles not having an encapsulating layer thereon. The color of the laser marks is bluish black as desired. The laser marking ability is better than that of the commercial comparison product.

Evaluation of Coloristic Properties of Markings and Test Samples

Light Stability Test:

2 g of the pigments according to examples 1 and 2 and comparative example 1 are mixed with 18 g of a PVC T-sol compound (product of Nippon Pigment Co.) under vacuum in a planetary mixer (ARV-310, Thinky Co.). The mixture is coated onto a 0.1 mm PET film and dried at 180° C. for 3 minutes. Each test piece has an overall thickness of about 0.5 mm.

3 test pieces having the same size and shape are prepared. The color of the test pieces is measured by a color measuring instrument (CR-400, Konica Minolta Co.) The test pieces are arranged adjacent to each other on a sample plate. A Xenon lamp emitting artificial solar light (XC-500, Seric Co.) is arranged in a distance of 45.5 cm right above the test pieces. One half of each of the test pieces is then covered by an aluminum foil. The remaining area of each test piece not covered by the aluminium foil is then exposed to light from the Xenon lamp (30.000 lux, 30 minutes).

The color difference between the part areas exposed to solar light and not exposed to solar light is then evaluated. The color difference is indicated as delta E ($\Delta E$, calculated by the colorimeter by using the L*, a*b* values of the exposed and the non-exposed part of each test piece).

Light Stability Test:

| Example | $\Delta E$ |
|---|---|
| example 1 | 0.8 |
| example 2 | 1.4 |
| comparative example 1 | 4.9 |

The test shows that polymer compounds containing the present pigments do not exhibit a significant change in color due to the exposure of solar radiation in contrast to polymer compounds containing non-encapsulated niobium-doped titanium dioxide particles.

Lightness of Test Samples and Markings:

Samples are prepared corresponding to the procedure of the laser marking evaluation described above.

The lightness value L* of the laser marking itself (must be as low as possible for obtaining dark markings) as well as the transparency of the respective test film (the higher the transparency, the better) is measured. In addition, the coloristic data (L*, a, b) of the test films containing the laser additive in the coating should be as neutral as possible.

The colorimetric measurement is performed on a piece of 20 mm×20 mm each, marked with 15 W vanadate laser (Trumpf VectorMark 5), 80% power, speed 2000 mm/s, frequency 80 kHz, line distance 50 μm (alternating mode). The colorimetric evaluation is performed with a Konica Minolta CR-400 color measuring instrument.

The Following Results are Achieved:

| Material | comp.1 | comp.2 | ex. 1 | ex.2 |
|---|---|---|---|---|
| L*-value laser marking | 53.8 | 64.2 | 59.9 | 60.2 |
| L*-value test film on white background | 85.6 | 87.6 | 85.9 | 85.5 |
| a-value test film | −1.1 | −0.6 | −1.0 | −1.1 |
| b-value test film | 3.0 | 5.2 | 3.3 | 3.1 |
| L*-value test film on black blackground | 49.4 | 46.2 | 46.7 | 45.1 |
| Transparency (calculated in %) | 42.3 | 47.3 | 45.6 | 47.3 |

Transparency of the test film is calculated as follows:

$$\text{Transparency} = [L^*\text{value(white background)} - L^*\text{-value (black background)}]/L\text{-value(white background)} \times 100\%$$

EXAMPLES 3-5

Laser Marking in Silicone Test Plates:

Laser markings in silicone polymers may be obtained only by using laser marking pigments exhibiting an intrinsic laser activity, since silicone polymers are not capable to carbonize when exposed to laser light. The pigments according to the present invention are tested in silicone polymer plates. To this end, silicone plates of Silopren LSP 2530 are prepared, having a content of the present pigments according to example 1 of 0.1% by weight (ex. 3), 0.3% by weight (ex. 4) and 0.5% by weight (ex. 5), respectively, based on the weight of silicone plate. The silicone plates are marked with a 15 W vanadate laser (Trumpf VectorMark 5), 99% power, speed 1000 mm/s, frequency 16 kHz. A rectangle of several cm² size is prepared in each case. The laser absorption rises with rising content of the laser absorbing pigment, leading to contrastful dark markings on a light background in good and excellent quality in examples 4 and 5.

The L*-values of the laser markings and of the test plates over white and black background are measures similar to examples 1, 2 and comparative examples 1 and 2 as described above, except that silicon test plates containing the laser absorbing pigments are used instead of coated test films containing the laser absorbing pigments in the coating.

The following results are achieved:

| Material | ex. 3 | ex. 4 | ex. 5 |
|---|---|---|---|
| L*-value laser marking | 46.0 | 35.8 | 33.1 |
| L*-value test plate on white background | 76.8 | 75.7 | 76.0 |
| L*-value test plate on black blackground | 45.8 | 57.0 | 63.3 |
| Transparency (calculated in %) | 40.3 | 24.7 | 16.8 |

Each of the test plates exhibits a clearly visible dark laser marking, whereby the laser markings according to examples 4 and 5 are of an especially desired darkness with good contrast. In addition, the transparency of the test plate remains acceptable while the color of the test plate is light bluish white which is highly desirable.

The invention claimed is:

1. Pigments comprising a particle containing niobium-doped titanium dioxide and a layer encapsulating the niobium-doped titanium dioxide containing particle, the encapsulating layer comprising at least a calcium compound wherein the calcium compound is CaO or a mixture of CaO with $CaCO_3$ and/or $CaTiO_3$.

2. Pigments according to claim 1, characterised in that the encapsulating layer in addition to the calcium compound contains at least one further metal oxide, wherein the metal is selected from the group consisting of Zr, Ce, Si, Al, Zn and V.

3. Pigments according to claim 1 wherein the percentual weight content of the at least one calcium compound in the encapsulating layer is at least 80% by weight, based on the weight of the encapsulating layer.

4. Pigments according to claim 1 wherein the pigments are subject to a thermal treating step under reducing conditions prior to the use thereof.

5. Pigments according to claim 1 wherein the pigments each consist of a core being composed of a niobium-doped titanium dioxide particle and of an encapsulating layer being located directly on top of the core.

6. Pigments according to claim 1 wherein the pigments each consist of a core being composed of a substrate particle having a layer of niobium-doped titanium dioxide directly located on the substrate particle, and of an encapsulating layer being located directly on top of the core.

7. Pigments according to claim 6, characterised in that the substrate particle consists of a silicatic material, of titanium dioxide, of titanium dioxide doped with Al, Si, Zr or Mn, of alumina, silica, carbon, graphite, iron oxide, barium sulfate and/or of a pearl pigment.

8. Pigments according to claim 1 wherein the niobium-doped titanium dioxide has a percentage molar proportion of niobium of 0.05 to 15%, based on the molar mass of titanium.

9. Pigments according to claim 1 wherein the encapsulating layer has a thickness in the range of from 0.5 to 1000 nm.

10. Pigment according to claim 5 wherein the percentual weight content of the encapsulating layer, based on the weight of the core, is in the range of from 1 to 30% by weight.

11. Pigments according to claim 1 wherein the pigments have a particle size in the range of from 0.01 to 100 nm.

12. A method of absorbing laser light comprising exposing pigments according to claim 1 within a polymer composition to laser light.

13. A method according to claim 12, wherein the pigments are present in a polymer composition in a proportion in the range of from 0.001 to 20% by weight, based on the total weight of the polymer composition.

14. A method according to claim 12 wherein the polymer composition comprises at least one polymer compound, the laser absorbing pigment, and one or more of solvents, fillers, additives and/or colorants.

15. A method according to claim 12, wherein the polymer compound is a thermoplastic, a thermoset, an elastomer or a silicone.

16. Polymer composition, comprising at least one polymer compound and a pigment according to claim 1.

17. Polymer composition according to claim 16, characterised in that the pigment is present in the polymer composition in a proportion of 0.001 to 20% by weight, based on the total weight of the polymer composition.

18. Polymer composition according to claim 16 wherein the polymer compound is a thermoplastic, a thermoset, an elastomer or a silicone.

19. Laser markable article consisting of a corpus having a surface, characterised in that the corpus or at least a part of the surface thereof comprises a polymer composition according to claim 16.

20. Laser markable article according to claim 19, characterised in that the corpus has a laser marking on the surface.

* * * * *